(12) United States Patent
Henry et al.

(10) Patent No.: US 9,170,104 B2
(45) Date of Patent: Oct. 27, 2015

(54) LEVEL VIAL AND METHOD OF MANUFACTURING SAME

(71) Applicant: STANLEY BLACK & DECKER, INC., New Britain, CT (US)

(72) Inventors: Michael Henry, Besancon (FR); Martial Devaux, Chatillon le Duc (FR)

(73) Assignee: STANLEY BLACK & DECKER, INC., New Britain, CT (US)

( * ) Notice: Subject to any disclaimer, the term of this patent is extended or adjusted under 35 U.S.C. 154(b) by 126 days.

(21) Appl. No.: 14/107,908

(22) Filed: Dec. 16, 2013

(65) Prior Publication Data

US 2015/0168143 A1 Jun. 18, 2015

(51) Int. Cl.
*G01C 9/24* (2006.01)
*G01C 25/00* (2006.01)
*G01C 9/34* (2006.01)

(52) U.S. Cl.
CPC .. *G01C 9/24* (2013.01); *G01C 9/34* (2013.01); *G01C 25/00* (2013.01)

(58) Field of Classification Search
CPC ............ G01C 9/24; G01C 9/34; G01C 25/00; G01C 9/26
USPC .......................................... 33/348.2, 379–389
See application file for complete search history.

(56) References Cited

U.S. PATENT DOCUMENTS

| | | | |
|---|---|---|---|
| 3,311,990 A | 4/1967 | Wright | |
| 3,593,428 A | 7/1971 | Jacoff | |
| 3,842,514 A | 10/1974 | Scheyer | |
| 4,347,088 A | 8/1982 | Jacquet | |
| 4,436,686 A | 3/1984 | Drori | |
| 5,588,217 A | 12/1996 | Lindner et al. | |
| 5,651,186 A | 7/1997 | Lindner et al. | |
| 6,243,957 B1 | 6/2001 | Gruetzmacher, Jr. et al. | |
| 6,343,422 B1* | 2/2002 | Takahashi | 33/379 |
| 6,572,073 B2 | 6/2003 | Jacoff | |
| 6,912,793 B2 | 7/2005 | Jacoff | |
| 6,957,494 B1 | 10/2005 | Foran | |
| 7,086,167 B2 | 8/2006 | Foran | |
| 7,350,305 B2* | 4/2008 | Molitorisz | 33/381 |
| 7,464,479 B2 | 12/2008 | Tran | |
| 7,784,193 B2 | 8/2010 | Scheyer | |
| 8,336,221 B2 | 12/2012 | Steele et al. | |
| 2005/0155241 A1 | 7/2005 | Scheyer | |
| 2006/0231971 A1 | 10/2006 | Foran | |
| 2008/0250662 A1* | 10/2008 | Allemand | 33/379 |
| 2011/0162222 A1* | 7/2011 | Ben-Josef et al. | 33/379 |
| 2013/0091717 A1 | 4/2013 | Steele et al. | |
| 2013/0167387 A1* | 7/2013 | Lueck et al. | 33/374 |
| 2014/0237833 A1* | 8/2014 | Schubert et al. | 33/365 |
| 2015/0113819 A1* | 4/2015 | Silberberg | 33/381 |

FOREIGN PATENT DOCUMENTS

| | | |
|---|---|---|
| DE | 19822646 | 5/1999 |
| EP | 0 455 979 | 11/1991 |
| EP | 0932024 | 8/2001 |
| GB | 1 037 566 | 7/1966 |
| GB | 2 489 836 | 10/2012 |
| WO | 02/102571 | 12/2002 |

\* cited by examiner

*Primary Examiner* — G. Bradley Bennett
(74) *Attorney, Agent, or Firm* — Pillsbury Winthrop Shaw Pittman LLP

(57) ABSTRACT

A level vial is provided that includes an outer structure disposed over the outer surface of an inner structure. The inner structure has an outer surface and interior surface. An internal cavity is defined by the interior surface. Laser markings are present in the inner structure on the outer surface and/or between the outer surface and interior surface of the inner structure. A liquid is sealed within the internal cavity. A method for manufacturing a level vial is also provided. The method includes providing an inner structure and molding a second structure over the outer surface of the inner structure. Radiation is transmitted through the second structure to form a marking on the inner structure. A liquid is sealed within the internal cavity.

28 Claims, 6 Drawing Sheets

LEVEL VIAL AND METHOD OF MANUFACTURING SAME

BACKGROUND OF THE INVENTION

The present invention relates to levels and more particularly to level vials and methods for manufacturing the same.

Level vials typically contain a liquid within which a bubble or other indicia is used to determine whether the vial, or level body on which the vial is mounted, is level (or placed on a level surface). The vial typically has marking formed thereon to enable the user to compare the position of the bubble or indicia within the liquid to the position of the marking, and hence whether the vial or level body is level. The present invention provides an improvement in the vial and in the method of manufacturing the same.

SUMMARY OF THE INVENTION

One aspect of present patent application provides a level vial. In one embodiment, the level vial includes a first inner structure having an outer surface and an interior surface. The interior surface defines an internal cavity. The inner structure further includes a laser marking on the outer surface and/or between the outer surface and interior surface. A second structure is disposed over the outer surface of the inner structure. A liquid is sealed within the internal cavity.

Another aspect of the present patent application provides a method to manufacture a level vial. In one embodiment, the method includes providing an inner structure having an outer surface and an interior surface. The interior surface defines an internal cavity. A second structure is molded over the outer surface of the inner structure. Radiation is transmitted through the second structure to form a marking on the inner structure. A liquid is sealed within the internal cavity.

These and other aspects of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise.

DETAILED DESCRIPTION OF THE ILLUSTRATED EMBODIMENT(S)

Figure 1:
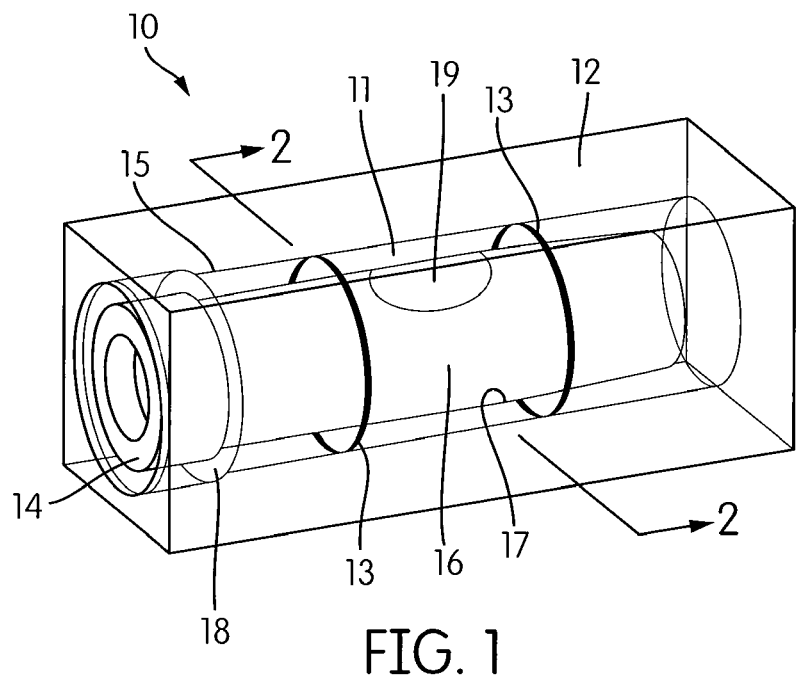
FIG. 1 is a perspective view of a level vial according to an embodiment of the invention.

Referring now more particularly to the drawings, FIGS. 1-6 show an embodiment of a level vial, generally indicated at 10, embodying various principles of the present specification. Turning to FIG. 1, level vial 10 includes a first inner structure 11 surrounded by a second outer structure 12. Inner structure 11 and outer structure 12 are made from a transparent or a translucent material. Inner structure 11 includes an outer surface 15 and an interior surface 17. An internal cavity 16 is defined by interior surface 17. In one embodiment, the outer surface 15 of tubular inner structure 11 has a generally cylindrical shape. In other embodiments, the inner structure 11 is not tubular but rather may be other shapes, such as a general disc shape. A disc shaped inner structure may be used, for example, in a bulls-eye level. Markings 13 are formed on the inner structure 11. In one embodiment, the markings 13 are formed on the outer surface 15. In another embodiment, markings 13 are formed below the outer surface 15. In one embodiment, markings 13 are formed by a laser beam according to a method as described below. Markings 13 are spaced apart to divide level vial 10 in three generally equal portions. In other embodiments, markings 13 need not divide level vial 10 into equal portions. In yet other embodiments, only one marking positioned at the center of level vial 10 is used. In one embodiment, the internal cavity 16, i.e. the interior surface 17, of inner structure 11 is barrel shaped. In other embodiments, the interior surface 17 may be banana shaped, or curved cylinder shaped, with the bulged portion disposed upwardly.

Interior cavity 16 of inner structure 11 may be filled with enough liquid to leave an air bubble as indicia 19 for making level measurements. In one embodiment, indicia 19 may be formed by adding a second liquid with a lower density into a first liquid, in which case, color may be added to either liquid to provide contrast.

Inner structure 11 may be formed by various methods. In one embodiment, inner structure 11 is injection molded around a core pin. Injection molding inner structure 11 may result in one end being sealed and the opposite end having an open side. The open end of inner structure 11 may be sized to be larger than the rest of inner structure 11 to accommodate cap 14. Interior surface 17 of inner structure 11 may include a ledge 18 to support cap 14 when cap 14 is inserted into the open end of inner structure 11. Cap 14 may be secured onto the open end of inner structure 11 after the molding process, and after liquid has been placed in the internal cavity 16 in order to seal the liquid in the inner structure 11. In other embodiments, injection molding forms two open ends, and a cap 14 is secured to both open ends of inner structure 11 after formation of inner structure 11. Cap 14 may be secured through ultrasonic welding. Other methods may be used to form inner structure 11, including extrusion forming, machining, and milling.

Inner structure 11 may be formed using a clear plastic such as polycarbonate. A polycarbonate having any of or combinations of the following physical properties may be used: a density of about 1.20 g/cm$^3$, a melt index (300° C./1.2 kg) of about 22 g/10 minutes, a molding shrinkage-flow of about 0.50 to 0.70%, a water absorption (23° C., 24 hr) of about 0.15%, and a water absorption (equilibrium, 23° C., 50% RH) of about 0.32%. A polycarbonate having any of or combinations of the following mechanical properties may be used: a tensile modulus of about 2340 MPA, a tensile strength to yield of about 60.0 MPA, a tensile strength to break of about 65.5 MPA, a tensile elongation to yield of about 6.0%, a tensile elongation to break of about 120%, a flexural modulus of about 2410 MPA, a flexural strength of about 96.5 MPA, and a taber abrasion resistance of about 45%. A polycarbonate having any of or combinations of the following impact properties may be used: a Charpy notched impact strength (23° C.) of about 20 kJ/m$^2$, a Notched Izod impact (23° C.) of about 747 J/m, an instrumented dart impact (23° C., total energy) of about 72.3 J, and a tensile impact strength of about 378 kJ/m$^2$. A polycarbonate having a Rockwell hardness of about 118 (R-Scale) or about 73 (M-Scale) may be used. A polycarbonate having any of or combinations of the following thermal properties may be used: a deflection temperature under load of about 142° C. (0.45 MPa, annealed), about 126° C. (1.8 MPa, unannealed), or about 139° C. (1.8 MPa, annealed), a Vicat softening temperature of about 147° C., a ball indentation temperature of about 125° C., and a CLTE-flow (−40 to 82° C.) or about 0.000068 cm/cm/° C. A polycarbonate having any of or combinations of the following electrical properties may be used: a volume resistivity of about 2.0E+17 ohm-cm, a dielectric strength of about 17 kV/mm, a dielectric constant (60 Hz) of about 3.00, a dielectric constant (1E+6 Hz) of about 3.00, a dissipation factor (50 Hz) of about 0.0010, a dissipation factor (1E+6 Hz) of about 0.0020, and a comparative tracking index (2.00 mm, Solution A) of about 250 V. A polycarbonate having any of or combinations of the following flammability properties may be used: a UL flame rating of V-2 at 1.59 mm, a UL flame rating of V-2 at 3.18 mm, an oxygen index of about 26%, and an average extent of burning of about 3 cm. A polycarbonate having any of or combinations of the following optical properties may be used: a refractive index of about 1.586, a transmittance of about 89.0%, and a haze of about 1.0%. In one embodiment, inner structure 11 is formed using the CALIBRE™ 303EP-22 polycarbonate resin from The Dow Chemical Company. A laser sensitive additive may optionally be added to the material of the inner structure 11.

Outer structure 12 is formed over the outer surface 15 of inner structure 11. In one embodiment, outer structure 12 is injection molded around inner structure 11. As shown in the figure, in one embodiment the outer structure 12 may form a rectangular block surrounding inner structure 11. In other embodiments, outer structure 12 may be formed to have any desired shape including a cylinder, disc, square block, rectangular block, half cylinder, a shape having a generally cylindrical upper portion and a rectangular block lower portion, and a shape having four perpendicular planar sides in a rectangular box configuration peripherally surrounding the inner structure and two convex sides, each on respective opposite ends of the inner structure.

In one embodiment, outer structure 12 is formed from an acrylic such as poly(methyl methacrylate) (PMMA). A PMMA having any of or combinations of the following mechanical properties may be used: a tensile modulus of about 3300 MPA, a stress at break of about 77 MPA, a strain at break of about 5.5%, and a Charpy impact strength (23° C.) of about 20 kJ/m$^2$. A PMMA having any of or combinations of the following thermal properties may be used: a Vicat softening temperature of about 108° C., a glass transition temperature of about 117° C., a temperature of deflection under 0.45 MPa load of about 103° C., a temperature of deflection under 1.8 MPa load of about 98° C., a coefficient of linear thermal expansion of about 8, a fire rating of B2, and a flammability UL 94 of HB. A PMMA with a melt volume rate of about 3 cm$^3$/10 min may be used. A PMMA having any of or combinations of the following optical properties may be used: a luminous transmittance of about 92%, a haze of less than 0.5, and a refractive index of about 1.49. A PMMA having a density of about 1.19 g/cm$^3$ may be used. In one embodiment, outer structure 12 is formed using the PLEXIGLAS® 8N molding compound from Evonik Industries.

Figure 10:
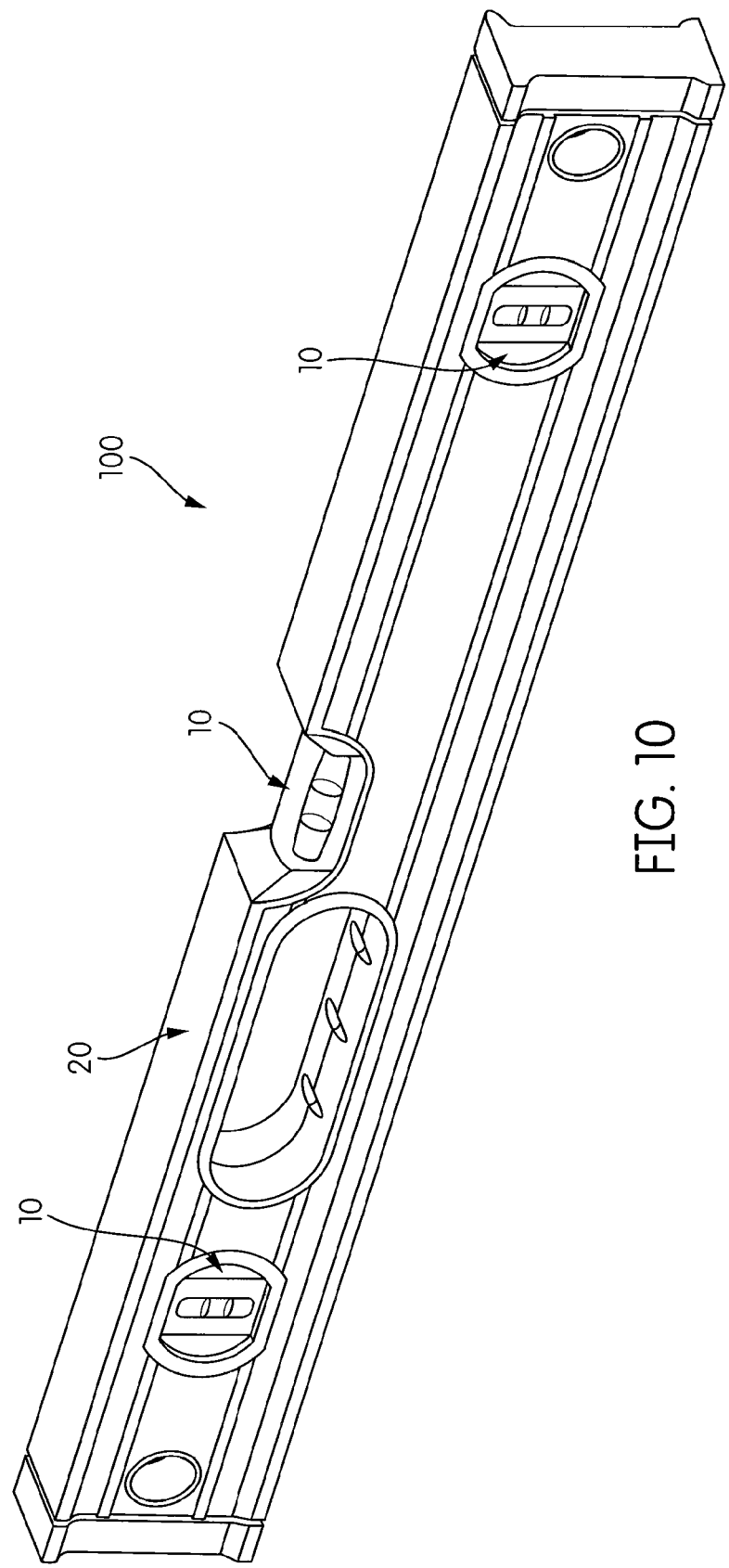
FIG. 10 is a perspective view of a level vial according to an embodiment of the invention mounted to a level frame.

Inner structure 11 and outer structure 12 may be formed to any size depending on the need. For example, level vial 10 may be used alone, attached to a product, or in conjunction with a level frame. If used in conjunction with a level frame (as shown in FIG. 10), level vial 10 may be sized to fit into the level frame. If used alone, level vial 10 may be formed to a larger size to allow for ease of handling by a user.

Figure 2:
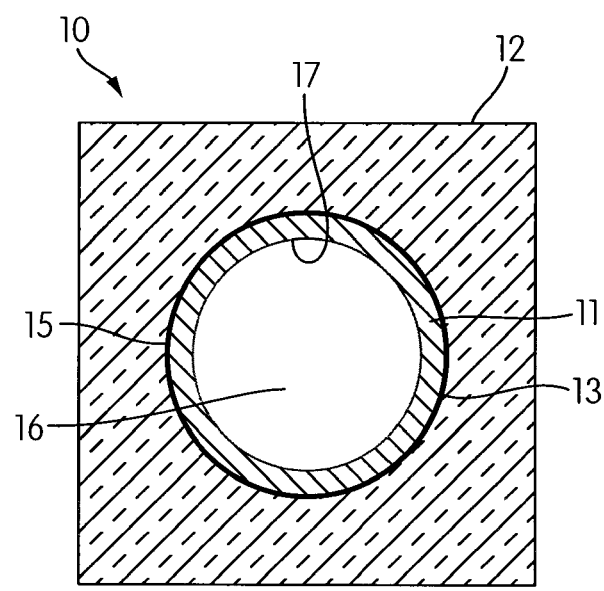
FIG. 2 is a cross-sectional view of the level vial shown in FIG. 1 as seen from and in the direction indicated by line 2-2.

Referring to FIG. 2, a cross-sectional view of the level vial 10 in FIG. 1 is shown as seen from and in the direction indicated by line 2-2 in FIG. 1. Inner structure 11 has a thickness that is defined by outer surface 15 and interior surface 17. Inner structure 11 may be formed to have any thickness desired. An inner structure 11 that is thick may be stronger. An inner structure 11' that is thin may use less material.

Internal cavity 16 is defined by the interior surface 17 of inner structure 11. In the embodiment shown in the figure, inner cavity 16 has a substantially circular cross section. For an internal cavity 16 that is barrel shaped, the cross sectional diameter of internal cavity 16 varies along the length of level vial 10. For an embodiment where the internal cavity 16 is barrel shaped and the outer surface 15 is cylindrical, the thickness of inner structure 11 varies along the length of level vial 10.

In one embodiment, inner structure 11 includes marking 13 formed between the outer surface 15 and interior surface 17, such as immediately beneath the outer surface 15. In one embodiment, marking 13 may be formed on the outer surface 15 of inner structure 11. Providing marking 13 either on the outer surface 15 of inner structure 11 or between the outer surface 15 and interior surface 17 allows interior surface 17 of inner structure 11 to remain a smooth continuous surface with no interruptions or discontinuities. Marking 13 may be formed using a laser beam according to a method as described below.

Outer structure 12 surrounds the outer surface 15 of inner structure 11. In the embodiment shown in FIG. 2, outer structure 12 forms a square cross sectional shape. In other embodiments, outer structure 12 may be formed to have different cross sectional shapes, such as rectangles and circles. Outer structure 12 may be formed to any size depending on the need and desire.

Figure 3:
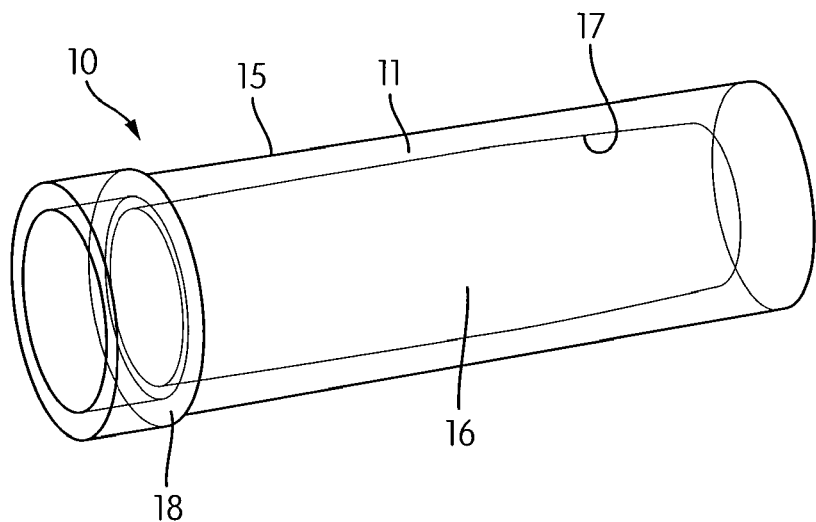
FIG. 3 is a perspective view of the inner structure of the level vial shown in FIG. 1.
Figure 4:
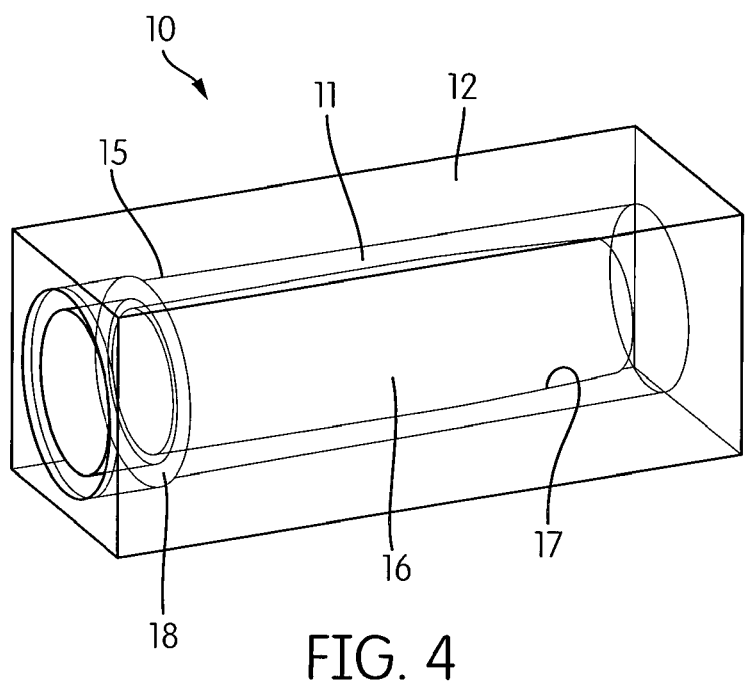
FIG. 4 is a perspective view of the level vial shown in FIG. 1 after the outer structure is formed over the inner structure.
Figure 5:
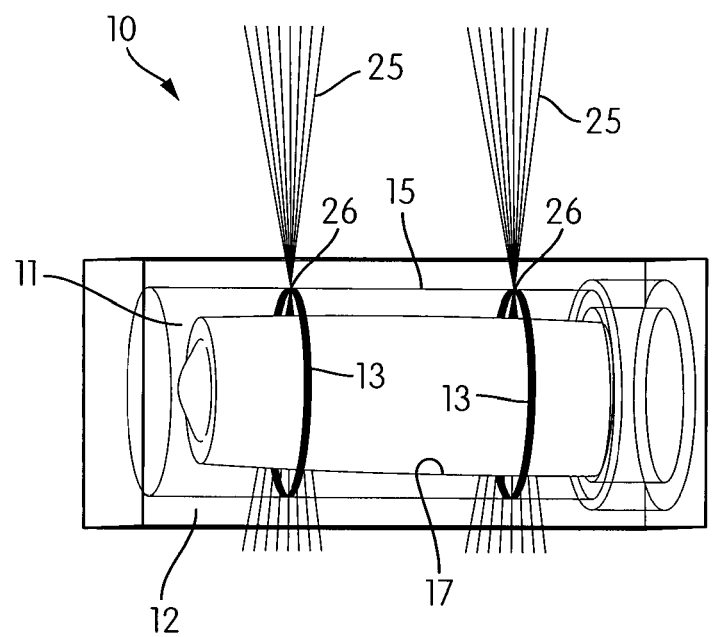
FIG. 5 is a perspective view of the level vial shown in FIG. 1 where a marking is being formed with a laser beam.

Turning to FIGS. 3-5, progression of manufacturing level vial 10 according to one embodiment is shown. As shown in FIG. 3, inner structure 11 is first made. Inner structure 11 may be produced by injection molding around a core pin, extrusion forming, machining, or milling. Inner structure 11 includes an outer surface 15 and an interior surface 17. An internal cavity 16 is defined by interior surface 17. An opening is left in one end of inner structure 11 in order to fill cavity 16 with the liquid. Interior surface 17 of inner structure 11 may include a ledge 18 to support cap 14 when cap 14 is inserted into the open end of inner structure 11. The opening may be sealed with a cap 14.

As shown in FIG. 4, outer structure 12 is formed around the outer surface 15 of inner structure 11. In one embodiment, outer structure 12 is injection molded around the outer surface 15 of inner structure 11. In the embodiment shown in FIG. 4, outer structure 12 forms a rectangular block around inner structure 11 with an opening for a cap 14. In other embodiments, outer structure 12 may be formed to have other shapes, including a cylinder, disc, square block, half cylinder, a shape having a generally cylindrical upper portion and a rectangular block lower portion, and a shape having four perpendicular planar sides in a rectangular box configuration peripherally surrounding the inner structure and two convex sides, each on respective opposite ends of the inner structure. In other embodiments, outer structure 12 may be formed to any size depending on need and desire. In one embodiment, outer structure 12 surrounds only a periphery of inner structure 12.

Interior cavity 16 of inner structure 11 may be filled with enough liquid to leave an air bubble as indicia for making level measurements. In one embodiment, indicia may be formed by adding a second liquid with a lower density into a first liquid, in which case, color may be added to either liquid to provide contrast. After filling interior cavity 16 of inner structure 11, cap 14 is secured onto inner structure 11 to seal in the liquid. Cap 14 may be secured by ultrasonic welding. The filling of interior cavity 16 with a liquid and sealing with cap 14 may be performed at various stages of the manufacturing process. In one embodiment, interior cavity 16 is filled with liquid and sealed after formation of inner structure 11 as shown in FIG. 3. In one embodiment, interior cavity 16 is filled with liquid and sealed after formation of inner structure 11 and after formation of outer structure 15 as shown in FIG. 4. In one embodiment, interior cavity 16 is filled with liquid and sealed after formation of inner structure 11, after formation of outer structure 15, and after formation of marking 13 as shown in FIG. 5 and described below.

Turning to FIG. 5, markings 13 are formed on inner structure 11. In one embodiment, the markings are formed between outer surface 15 and interior surface 17. In one embodiment, markings 13 are formed on the outer surface 15 of inner structure 11. In one embodiment, the markings 13 are formed on the outer surface 15 and also between the outer surface 15 and inner surface 17. Markings 13 are formed by laser beam 25. In one embodiment, laser beam 25 is transmitted through outer structure 12 and focused onto the outer surface 15 of inner structure 11 or into inner structure 11. Focal point 26 of laser beam 25 burns, carbonizes, foams, etches, ablates, forms bubbles on, or otherwise marks inner structure 11. In one embodiment, the laser beam 25 can be directed or guided by one or more optics (or optical elements), such as one or more lenses, mirrors, or combinations thereof, onto the area to be marked. The optics (e.g., lenses and/or mirrors) can also be configured and positioned relative to the inner structure 11 (while the vial 10 is being supported by an appropriate support structure) such that the focal point 26 of the laser radiation will be positioned at the area on the inner structure 11 to be marked. In one embodiment, only the focal point 26 of laser beam 25 leaves a mark. In this embodiment, the portions of laser beam 25 prior to and after focal point 26 do not leave a mark in outer structure 12 or inner structure 11. In one embodiment, laser beam 25 forms microscopic or nano-sized bubbles beneath and/or on the outer surface 15 which appears to the naked eye as a dark (e.g. black) mark. Level vial 10 may be rotated along the barrel axis in a 360° manner so that marking 13 forms an annular structure around the periphery of inner structure 11. In one embodiment, such as for a bulls-eye vial, marking 13 may form an annular structure on one side of the vial as a reference. In one embodiment, laser beam 25 is rotated around level vial 10 to form marking 13. In other embodiments, two or more laser beams may be used to form two or more markings simultaneously.

Figure 6:
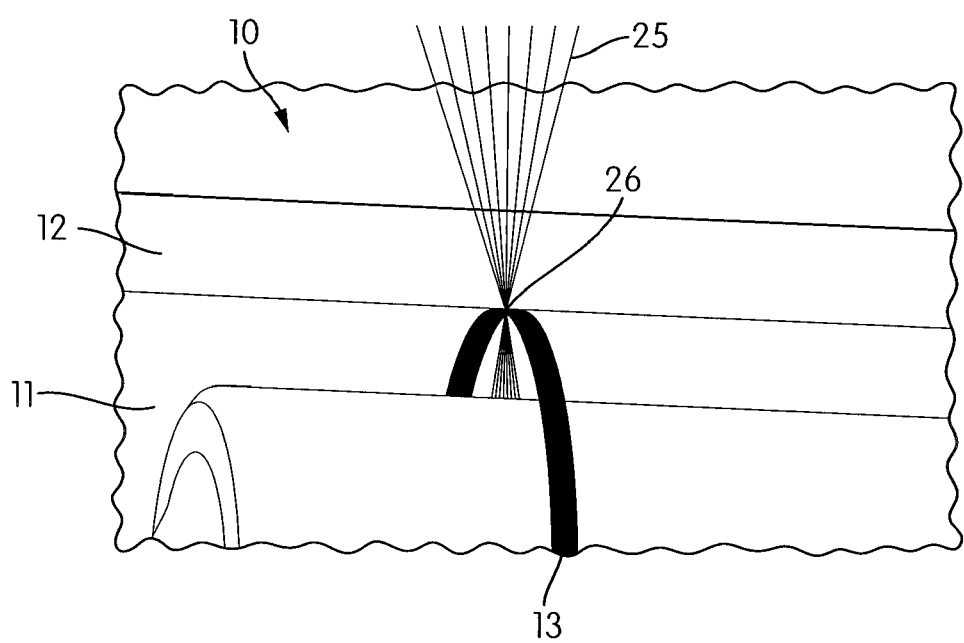
FIG. 6 shows a close-up view of a portion of the level vial shown in FIG. 1 where a marking is being formed with a laser beam.

Turning to FIG. 6, a close-up view of the formation of marking 13 with laser beam 25 according to an embodiment is shown. Level vial 10 includes an inner structure 11 and an outer structure 12. Laser beam 25 is transmitted through outer structure 12 and onto inner structure 11. Focal point 26 of laser beam 25 burns, carbonizes, foams, etches, ablates, or otherwise marks the outer surface of inner structure 21. The materials of the inner structure 11 and outer structure 12 are selected in conjunction with the characteristics (e.g., power, wavelength, duration) of the laser beam such that inner structure 11 is marked while laser beam 25 penetrates the material of the outer structure 12 so as to not leave a mark in the outer structure 12.

In one embodiment, a fiber laser marking system may be used to form marking 13 on or in inner structure 11. The fiber laser may, for example, be a 20 watt laser set at a 55% power level with a speed of 1500 mm/s, a frequency of 80 kHz, and a trigger time of 6 μs. In other embodiments, YAG or vanadate lasers may be used.

Figure 7A:
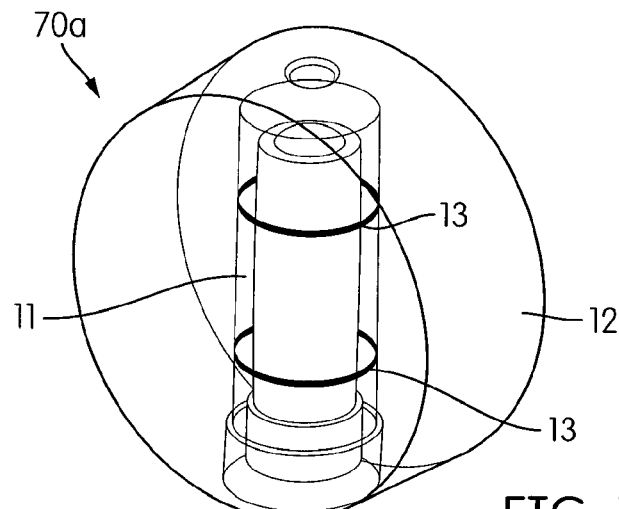
FIG. 7A is a perspective view of a level vial according to an embodiment of the invention wherein the outer structure of the level vial has a disc shape.
Figure 7B:
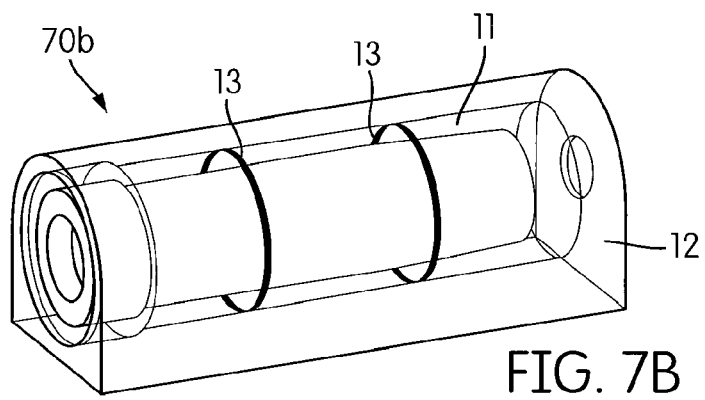
FIG. 7B is a perspective view of a level vial according to an embodiment of the invention wherein the outer structure of the level vial has a generally cylindrical upper portion and a rectangular box lower portion.
Figure 7C:
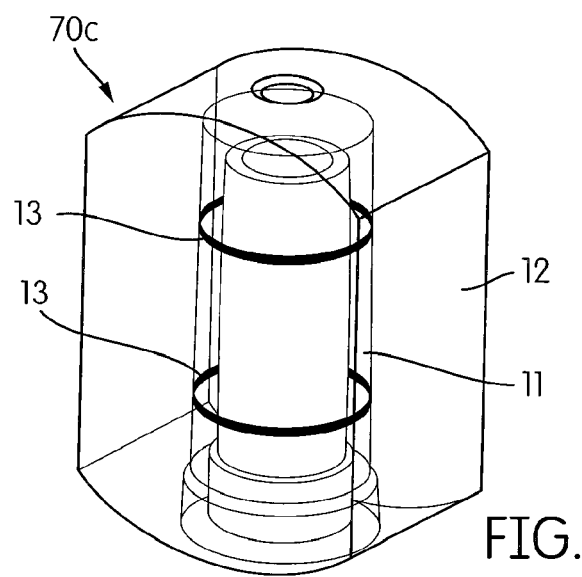
FIG. 7C is a perspective view of a level vial according to an embodiment of the invention wherein the outer structure of the level vial has four perpendicular planar sides in a rectangular box configuration peripherally surrounding the inner structure, and two convex sides, each on respective opposite ends of the inner structure.

Referring to FIGS. 7A-7C, different embodiments of a level vial are shown, each with a different shape formed by the outer structure. FIG. 7A shows level vial 70a, which includes inner structure 11 and outer structure 12. Inner structure 11 is tubular and includes markings 13. Outer structure 12 of level vial 70a forms a disc shape. FIG. 7B shows level vial 70b, which includes inner structure 11 and outer structure 12. Inner structure 12 is tubular and includes markings 13. Outer structure 12 of level vial 70b has a generally cylindrical upper portion and a rectangular box lower portion. FIG. 7C shows level vial 70c. Level vial 70c includes inner structure 11 and outer structure 12. Inner structure 11 is tubular and includes markings 13. Outer structure 12 of level vial 70c has four perpendicular planar sides in a rectangular box configuration peripherally surrounding the inner structure 11 and two convex sides, each on respective opposite ends of the inner structure 11. In other embodiments, the outer structure of a level vial may form any shape desired including cylinder, square block, and rectangular block.

Figure 8:
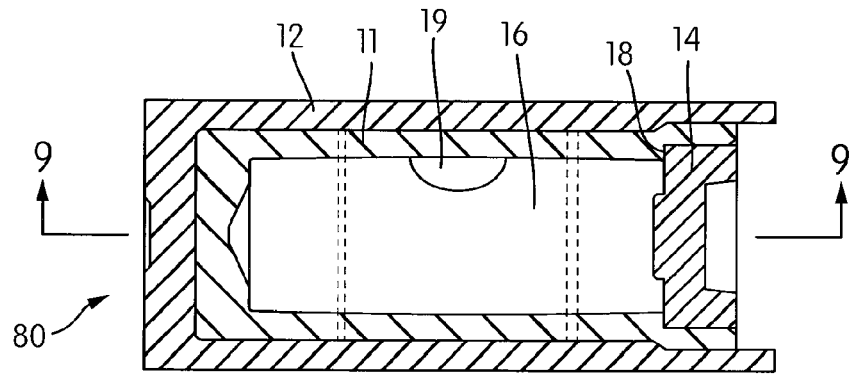
FIG. 8 is a cross-sectional view of a level vial according to an embodiment of the invention.
Figure 9:
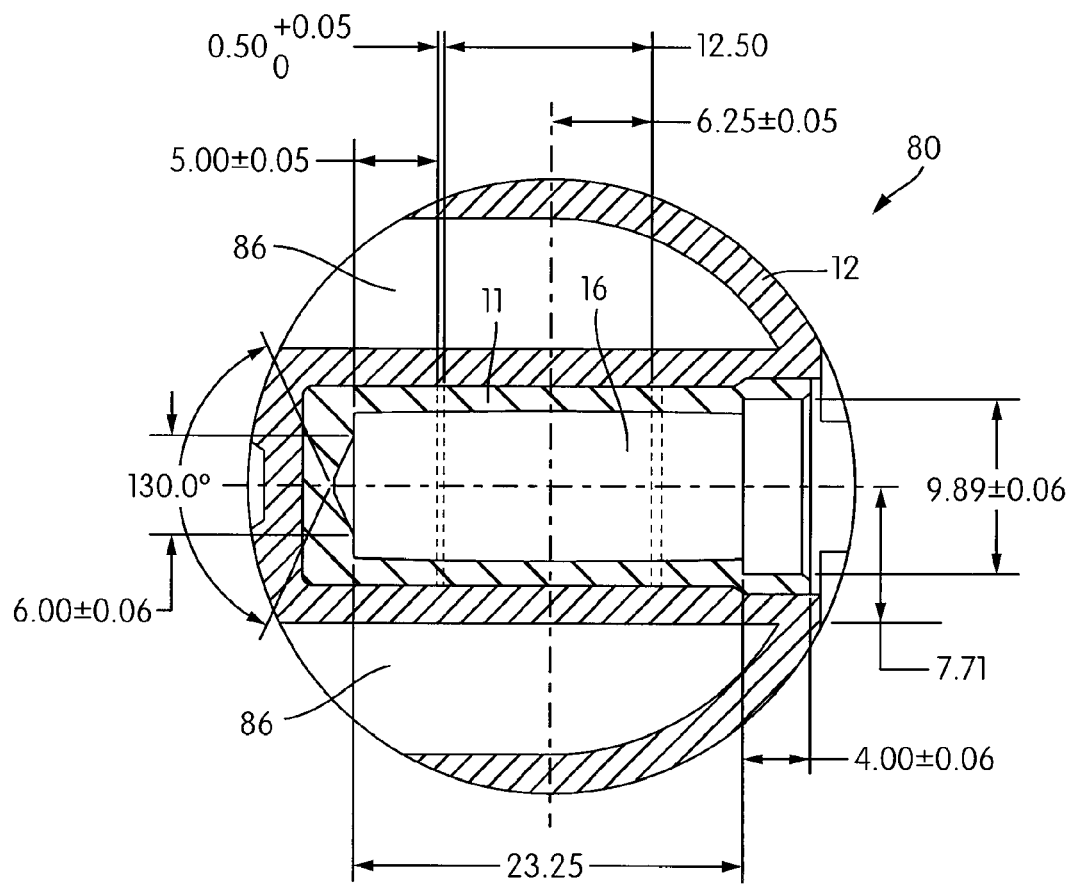
FIG. 9 is a cross-sectional view of the level vial shown in FIG. 8 as seen from and in the direction indicated by line 9-9.

Referring now to FIGS. 8 and 9, views of a level vial 80 according to another embodiment are shown. The outer structure 12 of level vial 80 has an overall geometry of a disc. Level vial 80 includes cavities 86 in the outer structure 12. Cavities 86 may be utilized to lessen the amount of material used or aid in the formation of the outer structure. FIG. 8 shows a cross-sectional view of level vial 80. This view is taken though the center of disc shaped level vial 80 with one of the flat sides of level vial 80 being disposed downwardly. Level vial 80 includes outer structure 12 surrounding inner structure 11.

Interior cavity 16 is defined by the interior surface of inner structure 11. Interior cavity 16 has a barrel-shape. Interior cavity 16 may be filled with enough liquid to leave an air bubble as indicia 19 for making level measurements. In one embodiment, indicia 19 may be formed by adding a second liquid with a lower density into a first liquid, in which case, color may be added to either liquid to provide contrast. Cap 14 is inserted into the open end of inner structure 11, resting on the ledge 18 formed by the interior surface of inner structure 11. Cap 14 is secured onto the open end of inner structure 11 to seal in a liquid in interior cavity 16. Cap 14 may be secured by ultrasonic welding. The dotted lines represent one location where markings may be formed on level vial 80 according to the laser marking methods described above.

Referring to FIG. 9, a cross-sectional view of the level vial 80 is shown as seen from and in the direction indicated by line 9-9 in FIG. 8. The cross-sectional view shown in FIG. 9 is taken through the middle of level vial 80. Level vial 80 includes outer structure 12 surrounding inner structure 11. Inner structure 11 includes an interior surface that defines interior cavity 16. Cavities 86 are formed in outer structure 12. In one embodiment, cavities 86 may be formed as part of the formation of outer structure 12. In one embodiment, cavities 86 may be formed in outer structure 12 after the formation of outer structure 12, such as by milling or machining outer structure after formation.

Referring to FIG. 10, a level assembly 100 is shown. Level vial 10 is placed in level frame 20. As shown in the figure, one level vial 10 is placed in a horizontal orientation on the level frame 20, while two level vials 10 are placed in a vertical orientation. Level vial 10 may be placed in other orientations on level frame 20 such as in a diagonal orientation.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

What is claimed is:

1. A method for manufacturing a level vial comprising:
    providing a first inner structure having an outer surface and an interior surface, wherein the interior surface defines an internal cavity;
    molding a second structure over the outer surface of the first inner structure;
    transmitting radiation through the second structure to form a marking on the first inner structure;
    providing a liquid into the internal cavity; and
    sealing the liquid in the internal cavity.

2. The method of claim 1, further comprising forming the first inner structure by molding.

3. The method of claim 2, wherein the internal cavity is barrel-shaped.

4. The method of claim 1, wherein the internal cavity is barrel-shaped and formed by internal machining or milling of the interior surface of the first inner structure.

5. The method of claim 1, wherein the second structure is molded over the outer surface of the first inner structure by injection molding.

6. The method of claim 5, wherein the second structure surrounds the outer surface of the first inner structure.

7. The method of claim 5, wherein the second structure directly contacts the outer surface of the first inner structure.

8. The method of claim 1, wherein the first inner structure comprises polycarbonate.

9. The method of claim 1, wherein the second structure comprises poly(methyl methacrylate).

10. The method of claim 1, wherein the providing of the liquid comprises filing the internal cavity with an amount of liquid that leaves a bubble within the internal cavity.

11. The method of claim 1, wherein the radiation is provided by a laser, and wherein the marking comprises bubbles formed on and/or beneath the outer surface of the first inner structure.

12. The method of claim 11, wherein the marking is a ring around the first inner structure.

13. The method of claim 1, wherein the radiation is provided to form two spaced markings around the first inner structure.

14. The method of claim 1, wherein the radiation does not form a marking on the second structure.

15. The method of claim 1, wherein the first inner structure is tubular.

16. The method of claim 1, wherein the first inner structure is a curved cylinder shape.

17. A level vial comprising:
    a first inner structure having an outer surface and an interior surface, wherein the interior surface defines an internal cavity;
    a second structure disposed over the outer surface of the first inner structure;
    a marking between the outer surface and interior surface of the first inner structure and/or on the outer surface of the first inner structure, wherein the marking is a laser marking; and
    a liquid sealed within the internal cavity.

18. The level vial of claim 17, further comprising a bubble within the liquid.

19. The level vial of claim 17, wherein the laser marking is a burn, an etching, an ablation, a carbonization, or a foaming.

20. The level vial of claim 17, wherein the internal cavity is barrel-shaped.

21. The level vial of claim 17, wherein the first inner structure comprises polycarbonate.

22. The level vial of claim 17, wherein the second structure comprises poly(methyl methacrylate).

23. The level vial of claim 17, wherein the marking comprises a ring around the first inner structure.

24. The level vial of claim 17, wherein the marking comprises a pair of spaced rings around the first inner structure.

25. The level vial of claim 17, wherein an outer surface of the second structure comprises a shape selected from the group consisting of a cylinder, disc, square block, rectangular block, half cylinder, a shape having a generally cylindrical upper portion and a rectangular box lower, and a shape having four perpendicular planar sides in a rectangular box configuration peripherally surrounding the inner structure and two convex sides on respective opposite ends of the inner structure.

26. The level vial of claim 17, wherein the first inner structure is tubular.

27. The level vial of claim 17, wherein the first inner structure is a curved cylinder shape.

28. The level vial of claim 17, wherein the marking comprises bubbles formed in the material of the first inner structure.

* * * * *